Nov. 4, 1930.  T. H. THOMAS  1,780,321
TRIPLE VALVE DEVICE
Filed Nov. 30, 1928
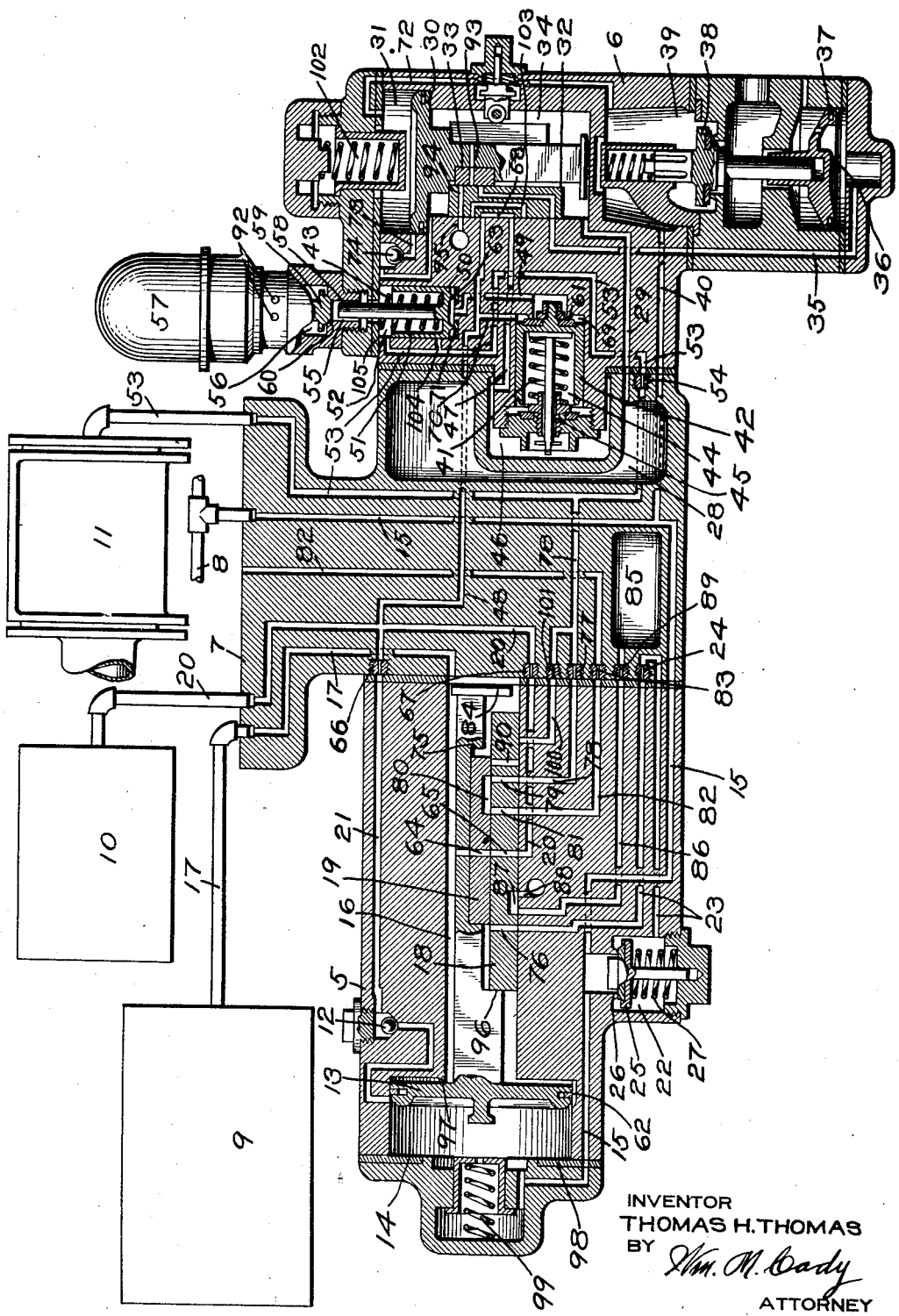
INVENTOR
THOMAS H. THOMAS
BY
*Wm. M. Cady*
ATTORNEY Patented Nov. 4, 1930

1,780,321

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRIPLE-VALVE DEVICE

Application filed November 30, 1928. Serial No. 322,634.

This invention relates to fluid pressure operated valve devices.

An object of the invention is to provide an improved valve mechanism especially adapted to be employed in fluid pressure brake systems for controlling the brakes.

Another object of the invention is to provide valve mechanism of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic section of a valve mechanism embodying the invention.

Referring to the drawing, the apparatus may comprise a service valve device 5 and an emergency valve device 6, both of which are connected to a pipe bracket 7. To the pipe bracket 7 are also connected the brake pipe 8, an auxiliary reservoir 9, a supplementary reservoir 10, and a brake cylinder 11.

The service valve device has a piston 13 mounted in a chamber 14 which is connected to the brake pipe 8 by a passage 15.

On the opposite side of the piston 13 there is a valve chamber 16 which is connected to the auxiliary reservoir 9 by a passage and pipe 17.

Contained in chamber 16 is a main slide valve 18 and a graduating slide valve 19 adapted to be operated by piston 13.

The supplementary reservoir 10 is connected to a passage 20 leading to the seat of the main slide valve 18. A passage 21 containing a ball check valve 12 connects the passage 20 with the chamber 14.

Mounted in a chamber 22 is a quick service check valve 25. The chamber 22 is connected to a passage 23 leading to the seat of slide valve 18. Passage 23 is provided with a choke plug 24 which is adapted to restrict the flow of fluid therethrough. Valve 25 is adapted to be forced against a seat rib 26 by an expansible coil spring 27, so as to normally cut off communication from the passage 15 to passage 23.

The emergency valve device 6 comprises a piston 30 contained in a piston chamber 31. The piston 30 is adapted to operate a main slide valve 32 and a graduating slide valve 33 contained in a valve chamber 34.

The valve chamber 34 is connected to a quick action chamber or reservoir 28 by a passage 29.

A quick action emergency valve device is provided comprising a piston 37 having the chamber 36 at one side connected to a passage 35 leading to the seat of the slide valve 32. The piston 37 is adapted to operate a brake pipe vent valve 38 contained in a chamber 39 which is connected to the brake pipe passage 15 by a passage 40.

For controlling the supply of fluid from the supplementary reservoir 10 to the brake cylinder 11, a valve piston 42 is provided, which is adapted to seat upon extreme movement in either direction and which is subject on one side to the pressure of a spring 41. The valve piston 42 has a chamber 44, at the left of the valve piston, open through a port 45 to a chamber 46 which is connected to a passage 47 leading to the seat of the main slide valve 32.

In the seated position of the valve piston 42 herein shown, the outer seated area connected to the supplementary reservoir passage 20 by a passage 48, is cut off from an inner seated area which is connected, by a passage 49, with a chamber 50.

Contained in chamber 50 is a valve piston 51, which is adapted to seat upon extreme movement in either direction and which is subject on one side to the pressure of a spring 43.

A chamber 52 on the spring side of the valve piston 51 is connected to the brake cylinder 11 by a passage and pipe 53 which is provided at the face of the pipe bracket 7 with a choke plug 54. Chamber 52 is also connected to a passage 55, and communication from passage 55 to the chamber 56 of a safety valve device 57 is controlled by a poppet valve 59.

The spring side of the valve piston 51 is provided with a stem 58 for engaging the poppet valve 59 which is normally seated against a seat 60 to shut off communication through the passage 55.

In operation, when the triple valve parts are in release position, as shown in the drawing, the valve chamber 16 and the auxiliary reservoir 9 are charged from the brake pipe 8 in the usual manner by way of the usual feed groove 62, around the triple valve piston 13.

The supplementary reservoir 10 is charged from the chamber 14, through passages 21 and 20 and from the valve chamber 16 through ports 64 and 65 in the graduating slide valve 19 and the main slide valve 18 respectively, and from thence through passage and pipe 20. The fluid flowing from piston chamber 14 by way of passage 21 passes the ball check valve 12 and is restricted by a choke plug 66 in passage 21. Passage 20 is also provided with a choke plug 67 through which the fluid from the valve chamber 16 flows to the supplementary reservoir 10.

When the supplementary reservoir is thus charged with fluid at brake pipe pressure, chamber 44 at one side of the high pressure valve piston 42 will also be charged with fluid by way of passage 48, cavity 68 in the main slide valve 32 of the emergency valve device 6, and passage 47 and chamber 69 on the opposite side of the valve piston 42 outside of the seat rib 61 will be charged by way of passage 70 connected to passage 48. Since the spring side of the valve piston 42 has a greater area than the opposite side thereof which is outside the seat rib 61, the fluid under pressure will, with the assistance of spring 41, force the valve piston tightly against the seat rib 61.

The emergency piston chamber 31 will also be charged with fluid under pressure from the brake pipe 8 by way of passage 40, vent valve chamber 39 and passage 72.

The emergency piston chamber 31 being connected to valve chamber 34 by a passage 73 provided with a ball check valve 74, fluid under pressure flows to valve chamber 34 and then through passage 29 into quick action chamber 28, thereby charging chamber 28 with fluid at brake pipe pressure.

With the apparatus thus charged with fluid under pressure from the brake pipe 8, the brake cylinder 11 is at atmospheric pressure, due to the connection through pipe and passage 53, passage 78, port 79 in the main slide valve 18, cavity 80 in slide valve 19, port 81, and the atmospheric passage 82. For the purpose of controlling the rate at which the fluid flows to the brake cylinder 11, passage 78 is provided with a choke plug 77. Likewise, passage 82 is provided with a choke plug 83 for restricting the rate at which the fluid flows therethrough.

After the apparatus is charged with fluid under pressure from the brake pipe 8, in the manner hereinbefore described, if it is desired to effect a service application of the brakes, the brake pipe pressure is reduced in the usual manner, and consequently the pressure in the chamber 14 is reduced to the same extent.

As the pressure of the fluid in the valve chamber 16 will then exceed the pressure of the fluid in piston chamber 14, piston 13 will be moved to the left toward the usual service position and communication from piston chamber 14 to the valve chamber 16 through the feed groove 62 will be cut off.

After the triple valve piston 13 has thus been moved a predetermined amount, a shoulder 75 on the piston stem will engage the graduating slide valve 19 and consequently the slide valve 19 will also be moved to the left by the triple valve piston 13, the main slide valve 18 of the triple valve remaining stationary.

When the graduating slide valve 19 is moved to the left, a port 76 in the main slide valve 18, which is connected to the passage 23, will be lapped, thereby cutting off the communication between valve chamber 16 and check valve chamber 22. Also port 65 will be lapped, and hence the supplementary reservoir 10 will be cut off from the triple valve chamber 16.

The brake cylinder 11, which is open to the atmosphere when the device is in release position, will be shut off from this connection when the ports 79 and 81 of the main slide valve 18 are lapped by the graduating slide valve 19, when the latter is moved to the left by the piston 13.

Continued movement of the piston 13 to the left will bring a shoulder 84 on the piston stem into engagement with the main slide valve 18, and the latter will then be moved to service position, in which passages 23, 20 and 82 are lapped.

The pipe bracket 7 is provided with a chamber 85, constituting a quick service bulb, which is connected to the seat of the main slide valve 18 by a passage 86 which has a choke plug 89 to restrict the flow of fluid therethrough.

When the device is in release position, the chamber 85 will be open to the atmosphere by way of passage 86, cavity 87 in the main slide valve 18, and atmospheric passage 88, but when the main slide valve 18 is moved to the left to service position, passage 88 will be lapped, and the cavity 87 will connect passage 86 with passage 23, leading from the chamber 22 of the quick service check valve. The pressure of the fluid in the brake pipe passage 15, acting on the quick service check valve 25, will now unseat this valve against the force exerted by spring 27, and fluid will quickly flow from the passage 15 into chamber 22 and from thence through passage 23, cavity 87, and passage 86, into the quick service bulb chamber 85.

In this way a sudden local reduction of brake pipe pressure is produced, thereby causing the usual quick service action to be propagated serially throughout the train.

As soon as the pressure of the fluid builds up in chamber 85 an amount substantially equal to the brake pipe pressure, spring 27 will force the valve 25 to its seat, thereby shutting off communication between the quick service bulb and the brake pipe passage 15, so as to prevent back flow from the quick service bulb to the brake pipe if the brake pipe pressure is further reduced.

In service position, the valve chamber 16 will be connected through a port 90, in the main slide valve 18, with passage 78. Fluid under pressure then flows from the auxiliary reservoir 9 through the valve chamber 16 and to the brake cylinder 11 by way of port 90, and passages 78 and 53, thereby effecting a service application of the brakes in the usual manner.

Passage 53 will permit fluid at brake cylinder pressure to flow to chamber 52 at the upper side of valve piston 51, thereby building up a pressure against the head of valve 59 of the safety valve device.

As valve piston 51 will be maintained on its seat by the pressure exerted by the fluid in chamber 52 and the additional pressure from the spring 43, leakage of the fluid past the seat of the valve piston 51 will be prevented, and the pressure will consequently build up against the valve 59.

Inasmuch as the safety valve device 57 is adapted to be actuated to relieve an excess of fluid pressure which may be delivered to the brake cylinder 11 from the auxiliary reservoir 9 during a service application of the brakes, should the pressure of the fluid in chamber 52 and passage 55 exceed the force within the safety valve device 57 tending to retain the valve 59 seated, then the valve 59 will be unseated and the excess fluid will flow from chamber 52 into chamber 56, and from thence to the atmosphere through one or more openings 92 in the safety valve device 57.

In this way the maximum pressure of the fluid admitted to the brake cylinder 11 during a service application of the brakes will be limited, because the safety valve 59 will be automatically operated.

When a service application of the brakes is being effected in the manner hereinbefore described, when the brake pipe pressure is reduced in the passage 15, the fluid pressure in the emergency piston chamber 31 will also be reduced, inasmuch as chamber 31 is in communication with the brake pipe passage 15 by way of passage 72, vent valve chamber 39, and passage 40.

Therefore, when the pressure of the fluid in piston chamber 31 is reduced a predetermined amount, the pressure of the fluid in valve chamber 34 will force the piston 30 upwardly until a port 93 in graduated slide valve 33 registers with a port 94 in the main slide valve 32 of the emergency valve device 6. Whereupon fluid under pressure from the quick action chamber 28 will be vented to the atmosphere by way of passage 29, valve chamber 34, ports 93 and 94, and atmospheric passage 95. When the pressure of fluid in quick action chamber 28 and in valve chamber 34 has been reduced to a degree slightly less than the reduced brake pipe pressure, piston 30 will be moved back to release position by the higher brake pipe pressure in chamber 31.

The downward movement of the piston 30 causes the graduating slide valve 33 to lap the port 94 in the main slide valve 32, and thereby prevent further reduction of the pressure of the fluid in the quick action chamber 28 until the brake pipe pressure is further reduced, when the actuation of the piston 30 and the parts operated thereby will be repeated, as will be readily understood. The pressures on the piston 30 are thus kept substantially balanced so that a service rate of reduction in brake pipe pressure will not cause an emergency application of the brakes.

In order to hold the brakes applied after a service application thereof, the operator moves the brake valve (not shown) to lap position so that further escape of fluid from the brake pipe will be prevented. When the flow of fluid from the auxiliary reservoir 9 to the brake cylinder 11, in the manner heretofore described, has reduced the pressure in valve chamber 16 slightly below the pressure of the fluid in piston chamber 14, the higher brake pipe pressure in said piston chamber will move the piston 13 and graduating slide valve 19 to the right until a shoulder 96 on the stem of the piston 13 engages the adjacent end of the main slide valve 18. In this position, port 90 will be lapped by the graduating slide valve 19 and flow of fluid to the brake cylinder 11 by way of passage 78 and passage and pipe 53 is thereby stopped. Further movement to the right by the piston 13 and graduating slide valve 19 is prevented by the main slide valve 18. The slight difference of pressure which was sufficient to move the piston 13 and the graduating slide valve 19 is unable to overcome the added resistance of the main slide valve 18, hence there is no further movement.

It will be noted that the main slide valve 18 remains in service position, a movement of the piston 13 and graduating slide valve 19 only being required to lap the slide valve 18. Consequently when in this position, but a slight reduction in brake pipe pressure is required to again bring the piston 13 and graduating slide valve 19 into service position. In this manner the brakes may be graduated on in steps, by stepping down the brake pipe pressure and causing corresponding increases in brake cylinder pressure.

When it is desired to release the brakes, the brake valve is operated to increase the fluid pressure in the brake pipe 8 and thereby increase the fluid pressure in piston chamber 14. When the pressure in chamber 14 has been increased a predetermined amount, sufficient force is exerted upon the piston 13 to move this piston and the main slide valve 18 and graduating slide valve 19 to the right toward release position. Further movement, in this direction, by the piston 13 will be prevented when the piston head engages a stop 97. The main slide valve 18 and the graduating slide valve 19 will now be positioned as shown in the drawing, whereupon the fluid in brake cylinder 11 will exhaust to the atmosphere by way of pipe and passage 53, passage 78, port 79, valve cavity 80, port 81, and passage 82, thus releasing the brakes.

When the parts are returned to release position, the system will again be recharged in the manner heretofore described.

If it is desired to graduate the release of the brakes, the brake pipe pressure may be gradually increased to cause the piston 13 to move to release position, whereupon the piston 13, main slide valve 18 and graduating slide valve 19 will be positioned to permit fluid from the brake pipe 8 to flow into piston chamber 14. Furthermore, the fluid in the brake cylinder 11 will be permitted to flow to the atmosphere by way of pipe and passage 53, passage 78, port 79, valve cavity 80, port 81, and passage 82. However, inasmuch as communication will be established between supplementary reservoir 10 and valve chamber 16 by way of pipe and passage 20 and ports 65 and 64 when the piston 13 is in released position, a pressure will be built up in valve chamber 16 an amount sufficient to overcome the increase in brake pipe pressure and move the piston 13 to the left toward release lap position. This action will cause the graduating slide valve 19 to lap port 65 so that communication from the supplementary reservoir 10 to the valve chamber 16 will be cut off. Furthermore, ports 79 and 81 will be lapped by the graduating slide valve 19, because the main slide valve 18 will remain in release position, and therefore the further exhaust of fluid from the brake cylinder to the atmosphere will be prevented, and the fluid remaining in the brake cylinder is retained.

In this way by successively stepping up brake pipe pressure, the brake cylinder pressure can be released in successive steps.

When a sudden reduction in brake pipe pressure is made to effect an emergency application of the brakes, piston 13 will be shifted quickly to the left, engaging the seat 98 and compressing the spring stop 99. In this movement, the main slide valve 18 will be moved to connect passage 100 with the valve chamber 16, and the fluid under pressure in chamber 16 will flow past choke plug 101 into the brake cylinder 11 by way of passage 78 and passage and pipe 53.

The sudden reduction of pressure in the brake pipe passage 15, also causes a corresponding reduction of pressure in the emergency piston chamber 31, hence the piston 30 will be moved upwardly, compressing the spring stop 102 and shifting the slide valve 32 to uncover port 35, thereby permitting fluid under pressure from the quick action chamber 28 to flow to piston chamber 36 and force the quick action piston 37 upwardly. The upward movement of piston 37 will unseat the vent valve 38, so as to cause a quick serial venting of the brake pipe in the usual manner.

The shifting of the slide valve 32 also causes the cavity 103 to connect port 47 with the atmospheric port 95, thereby venting the fluid from chamber 46 and the spring side of valve piston 42.

The venting of the fluid from the spring side of the valve piston 42 permits the pressure of fluid from the supplementary reservoir 10, acting on the area outside of the seat ring 61 on the opposite side to unseat said valve piston, against the force exerted by spring 41, thereby permitting fluid under pressure to flow from the supplementary reservoir 10 to the lower side of the cut off valve piston 51. The fluid flowing from chamber 69, through passage 49 to the lower face of valve piston 51 will force the seat rib 63 from the seat 71 and said valve piston will be raised against the pressure of spring 43, the opposite side of the valve piston being seated against the gasket 105. With the valve piston 51 in this position, fluid under pressure from the supplementary reservoir 10 is permitted to flow to brake cylinder 11 by way of port 104 and passage 53.

The almost simultaneous movement of the valve piston 42 with the movement of the slide valve 32 permits the immediate flow of fluid from the supplementary reservoir 10 to the brake cylinder 11, in addition to equalization of the usual supply of fluid from the auxiliary reservoir 9, so that a high pressure is quickly secured in the brake cylinder as soon as an emergency application of the brakes is initiated.

When the valve piston 51 is moved upwardly to uncover the port 104 and the upper portion thereof is seated against the gasket 105, communication to the safety valve device 57 through passage 55 will be cut off, so as to prevent a reduction in the high brake cylinder pressure obtained in the emergency application of the brakes.

It will be seen that with the above described construction, all of the choke plugs are disposed in the faces of the pipe bracket 7 to which the service valve device 5 and the emergency valve device 6 are respectively fixed. In this way these elements are readily accessible for inspection, replacement, or repair when either of the said devices are removed from the pipe bracket 7.

In triple valve devices of the type above described, it has heretofore been the practice to construct a valve device suitable for each different size of equipment and to control the rate of flow of the fluid to and from the brake cylinder and other parts of the equipment by ports in the slide valves and their seats. Hence, the use of each valve device was limited to the size of equipment for which the valve device was designed. Therefore, it was necessary to produce specially designed valve devices for each size of equipment, because a valve device designed to be used with a small equipment was unsuited for use with the large equipments, since insufficient flow area would be had, and vice versa, a valve device designed for use with the large equipments would be unsuitable for use in the small equipments, as too much flow area would be provided.

Accordingly, one of the features of the present invention resides in the particular design of the triple valve device by which removable choke plugs for controlling the rate of flow of the fluid passing through the valve device are placed adjacent to the face of a removable portion of the valve body so as to be conveniently disposed for removal and replacement.

By employing removable choke plugs having restricted passages of the proper size for controlling the rate of flow instead of controlling the rate of flow by the size of the ports in the slide valves of the triple valve device, it will be evident that the same triple valve device may be employed for all equipments, regardless of size.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe and a brake cylinder, of a pipe bracket, connections from said brake pipe and said brake cylinder to said pipe bracket, a reservoir in said pipe bracket, and a plurality of valve devices carried by the pipe bracket for controlling the supply of fluid to the brake cylinder, one of said valve devices being operative upon a reduction in brake pipe pressure for connecting said brake pipe to said reservoir to effect a predetermined local reduction in brake pipe pressure.

2. In a fluid pressure brake, the combination with a brake pipe and a brake cylinder, of a pipe bracket connected to said brake pipe and said brake cylinder, a reservoir in said pipe bracket, an auxiliary reservoir, a supplementary reservoir, both being connected to said pipe bracket, means carried by said pipe bracket for supplying fluid from the auxiliary reservoir to the brake cylinder upon a gradual reduction of brake pipe pressure and for connecting said brake pipe to said pipe bracket reservoir to effect a predetermined local reduction in brake pipe pressure, means for preventing an excess in brake cylinder pressure when said fluid supply means is actuated, means carried by said pipe bracket for supplying fluid from said auxiliary reservoir and from said supplementary reservoir simultaneously to said brake cylinder upon a sudden reduction in brake pipe pressure, and means for rendering said excess fluid control means inoperative when said last named means are operated.

3. In a fluid pressure brake, the combination with a brake pipe and a brake cylinder, of a pipe bracket provided with a quick service bulb, connections from said brake pipe and said brake cylinder to said pipe bracket, a plurality of valve devices connected to said pipe bracket for controlling the supply of fluid to the brake cylinder, and means for establishing communication between one of the valve devices and said bulb when a predetermined reduction is made in brake pipe pressure.

4. In a fluid pressure brake, the combination with a brake pipe and a brake cylinder, of a pipe bracket connected to said brake pipe and said brake, a plurality of valve devices, faces on said pipe bracket to which said valve devices are secured, a plurality of passages in the pipe bracket communicating with passages in said valve devices, and choke plugs for restricting the flow of fluid through the passages, all of said choke plugs being mounted in the faces of the bracket.

5. In a triple valve device, a brake pipe, a brake cylinder, a valve for controlling the supply of fluid under pressure to and its release from the brake cylinder, means separate from said valve and having a restricted passage controlling communication through which fluid under pressure is supplied to and released from said brake cylinder by said valve, other means separate from said valve and having a restricted passage for also controlling communication through which fluid under pressure is released from the brake cylinder by said valve, and means operated upon a reduction in brake pipe pressure for actuating said valve.

In testimony whereof I have hereunto set my hand, this 27th day of November, 1928.

THOMAS H. THOMAS.